March 31, 1970  W. C. LONDON  3,503,487
ARTICLE FEEDING APPARATUS
Filed March 11, 1968
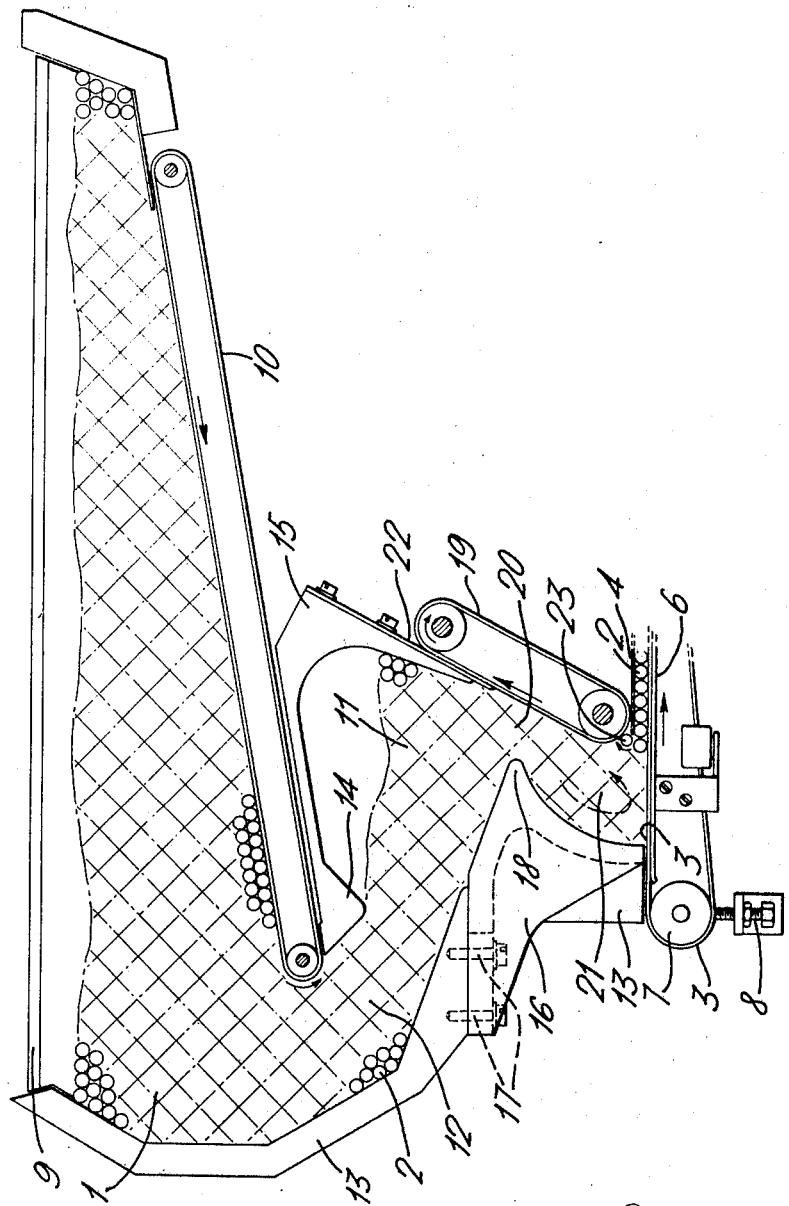

3,503,487
ARTICLE FEEDING APPARATUS
William Charles London, Deptford, London, England, assignor to Molins Machine Company Limited, London, England, a corporation of Great Britain
Filed Mar. 11, 1968, Ser. No. 712,184
Claims priority, application Great Britain, Feb. 16, 1968, 7,765/68
Int. Cl. B65g 47/18
U.S. Cl. 198—57                        14 Claims

ABSTRACT OF THE DISCLOSURE

A gravity feed hopper for feeding plugs being lengths of cigarette filter material from trays into a single, high-speed stream moving transversely to their lengths, having a first endless belt moving across the bottom of the hopper to support the plugs in the hopper and to withdraw them therefrom in said stream and a second upwardly extending moving belt to break up the flow of plugs immediately above the first belt to enable them to form into said stream.

---

This invention is concerned with improvements in or relating to article feeding apparatus and is particularly concerned with producing a continuous stream of rod-like articles, such as, for example, plugs of tobacco-smoke filtering material for incorporation in tobacco articles from a batch supply of such articles.

In the cigarette manufacturing industry, it is common practice to provide filtering material for filter cigarettes in the form of rod-like plugs consisting of multiples of the length of plug required in a cigarette, from a bulk supply of such plugs. The bulk supply is commonly handled in trays in which several thousand such multiple length plugs are stacked to lie side-by-side and endwise across the tray, whereas in the manufacturing process in which the plugs are cut up into the small lengths which are subsequently combined with tobacco rods, what is required is a continuous stream of articles moving at high speed.

It is an object of the present invention to provide an improved apparatus for supplying a continuous stream of rod-like articles from a batch supply thereof.

According to the present invention there is provided article feeding apparatus comprising a hopper having an inlet and an outlet for the articles and through which the articles can move downward under the action of gravity in which the inlet is adapted to receive batches of articles and the outlet is adapted to discharge the articles in a continuous stream, comprising a conveyor to support articles in the hopper and to remove them therefrom through the outlet thereof and comprising means above the level of the conveyor to provide some support for the weight of articles in the hopper and thereby to relieve the conveyor of some of the weight of the articles. Preferably the outlet is adapted to deliver the articles in a single stream moving transversely to their lengths and urged against one another to move out of the hopper. The apparatus can also include means to fluidise the flow of articles through the hopper in the region of the outlet from the hopper to enable them to jostle themselves into position to form the outlet stream. (By "fluidising" where this expression is used herein is meant producing some relative motion between the articles and also some rolling movement of the articles.) The means to fluidise the flow of articles can comprise a chamber formed above the conveyor and comprised on the one hand by a fixed wall of the hopper and on the other hand by an upwardly moving endless band opposed thereto. In addiiton a flow-restricting throat may be provided upstream of the chamber, through which the articles are fed downwardly through the hopper into the chamber. A further flow-restricting throat can be provided in the hopper upstream of the aforesaid throat to meter the flow of articles, a relief chamber being provided between said throats to accommodate fluctuations in the flows through the throats.

The hopper inlet may be in the form of a mouth which will be upstream of said further throat if such is provided, and which is extended horizontally to receive articles from a tray in which they are stacked. With advantage, further conveyor band is provided to support articles in the hopper below said mouth and to move them horizontally across the hopper towards said further throat.

It is found that different types of plugs behave in different ways in the hopper and that as a result it is necessary to adjust the amount of fluidising force which is exerted on the plugs according to their nature and this can be done by adjusting the width of the first mentioned throat and also by varying the size of the surface of the upwardly extending conveyor which is exposed to contact with articles in the hopper. Thus, for plugs having a high mutual coefficient of friction the width of said throat will be increased and the amount of exposed surface in the upwardly extending conveyor will be reduced.

An embodiment of the invention will now be described by way of example with reference to the accompanying drawing which is an elevation in section of a hopper for feeding plugs of cigarette filtering material.

Referring to the drawing, the apparatus shown comprises a hopper 1 for plugs 2 which are delivered in a single stream from the bottom of the hopper 1 by an endless band 3 running over a support plate 6 beneath a guide plate 4, and around a roller 7.

Means 8 are provided to adjust the spacing of the endless band 3 and the support plate 6 from the guide plate 4 according to the nature and behaviour of the plugs 2.

The plugs 2 are supplied to the hopper 1 from trays and for this purpose the hopper 1 is constructed to have a mouth 9 at the top which is shaped to receive a tray so that plugs can be lowered directly out of the trays into the hopper 1. The further construction of the hopper 1 is designed to facilitate the delivery of the plugs 2 in a single stream. The hopper 1 comprises a downwardly sloping endless band conveyor 10 which supports the weight of some of the plugs and urges them to move across the hopper 1. Beneath the conveyor 10 there is a relief chamber 11 into which the plugs 2 are delivered through a flow-limiting throat 12, defined between a wall 13 of the hopper 1 and a projection 14 in a fixed member 15 which defines the relief chamber 11. The plugs 2 flow down from the relief chamber 11 along the upper side of a constriction member 16 which is adjustably mounted in the hopper wall by means of bolts 17 and which has a projection 18 which extends into the plug flow. On the other side of the hopper 1 between the chamber 11 and the guide plate 4 there is disposed an upwardly extending endless moving band 19 which defines with the projection 18 a further throat 20 through which the plugs 2 move into a fluidiser chamber 21 which acts to produce some relative movement between the plugs and some rolling movement of them, the bottom of the chamber 21 being constituted by the band 3 which draws them out of the chamber. A cover plate 22 is adjustably secured to the fixed member 15 so as to be movable up and down the face of the belt 19 to vary the amount of the moving belt which is exposed to plugs in the hopper 1 so as to vary the fluidising effect of the belt 19 on the plugs 2. Thus, if the plugs 2 are plugs which have a relatively low mutual coefficient of friction, the cover plate 22 will be adjusted to an upper position so as to expose a large amount of the belt 19 and increase the fluidising force on the plugs 2. On the other hand if the mutual coefficient of friction is high, then the cover plate 22 will be adjusted to a lower position, since a smaller force is required to bring about the necessary fluidisation, and excessive force may cause the plug movement to become uncontrolled and disorderly.

All the bands 3, 10 and 19 are connected to a common drive so that the speeds of these bands are varied in direct proportion to one another according to the demand for the stream of plugs.

The operation of the apparatus is as follows. Plugs are fed into the hopper 1 through the mouth 9 from trays in which the are stacked, and moved downwardly through the hopper under the action of gravity towards the throat 12. Movement of the plugs 2 in the upper part of the hopper 1 is assisted by the endless band 10 which serves to move them across the hopper from the right-hand to the left-hand side and thereby to assist in maintaining the upper surface of the plugs more or less level. If this band 10 were not present there would be a tendency for plugs to pile up on the right hand side of the hopper, and for troughs to appear on the left hand side. This difference in height could lead to twisting and jamming of the plugs.

The throat 12 acts as a restriction of the plug flow, and so long as the downward pressure of plugs is more or less constant this will act as a metering device serving to feed an approximately constant flow of plugs into the relief chamber 11. The plugs move downwardly through the relief chamber 11 under the action of gravity through the throat 20 and in general the rate of flow through the throat 20 will be the same as the rate of flow through the throat 12. However, any difference in these flow rates is accommodated by the relief chamber 11 which acts as a small local reservoir, as the level of plugs in the chamber 11 can rise and fall. Once past the throat 20 and in the fluidiser chamber 21, the plugs are subjected to a number of forces which tend to give them a more or less circular movement as is indicated by the dotted arrow. Thus there is a downward force acting on the plugs arising from their own weight and from the weight of the stack of plugs above them, there is a horizontal force exerted by the endless band 3, and an upward force exerted by the refuser roller 23 and the band 19. The combined effect of all these forces is that the plugs are fluidised enabling them to jostle themselves into position to form the single row. It should at this point be noted that one effect of the throats 12 and 20, and of the upwardly moving band 19, is to tend to take the weight of the stack of plugs in the hopper off the lowermost plugs in the fluidiser chamber 21, thus enabling those lowermost plugs to undergo relative movement. If these lowermost plugs had to support the whole weight of the stack then it would be difficult to fluidise them and they would tend to jam. Once in the chamber 21, the plugs move in one of two directions; either they are pushed out of the chamber 21 by the endless band 3 and under the guide 4 in a pressure-fed single stream or alternatively they are carried upwardly by the band 19 either to recirculate in the fluidiser chamber 21 or to pass back through to the throat 20 into the relief chamber 11. Thus there is some flow in two directions through the throat 20. The adjusting means 8 are set so that there is some slight compression on the plugs lying between the conveyor band 3 and the guide plate 4, and at the same time the band 3 is run at a speed such that it slips under this line of plugs. Thus there is a considerable horizontal force acting on the line of plugs tending to push them along sideways and so gaps are unlikely to occur between the plugs. At the same time no bridging can occur since the width of the passage defined between the guide plate 4 and the conveyor band 3 is such that only one plug can pass at a time.

The single stream of plugs produced by this apparatus is virtually continuous and it is found in practice that it is rare for gaps to occur in the stream and that it is well suited to use high speed handling of plugs and the apparatus may be used as a supply of plugs or similar rod-like articles in any circumstances requiring such a stream. For example, it can be used in conjunction with the invention disclosed in United States patent application Ser. No. 708,928, filed Feb. 28, 1968, in the name of Horace A. Stone to feed plugs to the apparatus disclosed therein.

What I claim as my invention and desire to secure by Letters Patent is:

1. Article feeding apparatus comprising a hopper having an inlet and an outlet for the articles and through which a batch of articles can move downwardly under the action of gravity, the inlet being adapted to receive batches of articles and the outlet being adapted to discharge the articles downwardly in a continuous stream, conveyor means beneath said outlet to support the batch of articles in the hopper and to move the articles therefrom through the outlet and means above the level of the conveyor means to provide partial support for the weight of the batch of articles in the hopper and thereby to relieve the conveyor means of some of the weight of the batch of articles.

2. Apparatus according to claim 1 wherein the articles are elongated articles and means is provided at the outlet to deliver the articles from said outlet onto said conveyor in a stream consisting of a single row of articles moving transversely of their lengths and urged against one another.

3. Apparatus according to claim 1 wherein said means to provide partial support for the weight of the batch of articles comprises means to fluidize the articles in the region of the outlet of the hopper to enable them to be jostled into position to form the outlet stream.

4. Apparatus according to claim 3 wherein the means to fluidize the articles comprises a chamber in said hopper adjacent said outlet, said chamber being defined in part by a fixed wall of the hopper and comprising an upwardly extending endless band opposite thereto, the side of said endless band towards said fixed wall being capable of upward movement whereby articles in contact with the endless band are conveyed upwardly within the batch of articles.

5. Apparatus according to claim 4 wherein said upwardly moving endless band is inclined and diverges from said fixed wall such that said endless band supports a part of the weight of said batch of articles.

6. Apparatus according to claim 4 comprising means to vary the size of the surface of the upwardly extending conveyor band which is exposed to contact with articles in the hopper whereby the amount of fluidizing may be controlled.

7. Apparatus according to claim 4 wherein said means to provide partial support for the weight of articles further comprises a projection spaced above said conveyor means and extending from said fixed wall of said hopper in a direction towards said conveyor band, said projection and conveyor band defining therebetween a flow restricting throat through which the articles are fed downwardly through the hopper.

8. Apparatus according to claim 7 comprising means to regulate the distance between said projection and said conveyor band to vary the width of said throat.

9. Apparatus according to claim 7 wherein said means to provide partial support for the weight of articles further comprises means defining a further flow restricting throat upstream of the aforesaid throat to meter the flow of articles and a relief chamber between said throats to accommodate fluctuations in the flow rate through the throats.

10. Apparatus according to claim 1 wherein the hopper inlet is in the form of a mouth extending horizontally to receive articles from a tray in which they are stacked.

11. Apparatus according to claim 9 comprising further conveyor means to support articles in the hopper below said inlet and to move them horizontally across the hopper towards said further throat.

12. Apparatus according to claim 1 wherein said conveyor means beneath said outlet comprises a generally horizontally extending endless band, a guide plate spaced above said conveyor band adjacent the downstream side of the outlet of said hopper, and means for adjusting the spacing between the surface of said endless band and said guide plate whereby a slight compression on the articles lying between the surface of the conveyor band and the guide plate may be maintained and only a single row of said articles may be conveyed from said outlet.

13. Article feeding apparatus comprising a hopper having an inlet and an outlet for the articles and through which a batch of articles can move downwardly under the action of gravity, the inlet being adapted to receive batches of articles and the outlet being adapted to discharge the articles downwardly in a continuous stream, conveyor means beneath said outlet to support the batch of articles in the hopper and to move the articles therefrom in a substantially horizontal direction, and means located above said outlet for urging a portion of the articles in said hopper upwardly away from said outlet whereby the combination of the downward force of the weight of the batch of articles in the hopper, the horizontal force exerted by movement of said conveyor means beneath said outlet and the upward force exerted by said urging means within said hopper creates a generally circular movement among at least a part of the articles in said batch jostling said articles as they are discharged.

14. Article feeding apparatus as claimed in claim 13 wherein said urging means within said hopper comprises an upwardly extending endless band capable of upward movement and of contacting the surface of a portion of the articles in said hopper.

References Cited

UNITED STATES PATENTS

| 3,154,117 | 10/1964 | Florin | 198—57 |
| 3,355,004 | 11/1967 | Rupert | 198—53 |

FOREIGN PATENTS

| 1,129,676 | 5/1962 | Germany. |

RICHARD E. AEGERTER, Primary Examiner